(12) United States Patent
Lallier

(10) Patent No.: US 8,299,008 B2
(45) Date of Patent: Oct. 30, 2012

(54) COMPOSITIONS THAT CAN ESPECIALLY BE USED AS SOLVENTS FOR CLEANING PAINT WORK

(75) Inventor: Jean-Pierre Lallier, Saint Bonnet de Mure (FR)

(73) Assignee: Arkema France, Colombes (FR)

( * ) Notice: Subject to any disclaimer, the term of this patent is extended or adjusted under 35 U.S.C. 154(b) by 25 days.

(21) Appl. No.: 12/444,494

(22) PCT Filed: Oct. 10, 2007

(86) PCT No.: PCT/FR2007/052110
§ 371 (c)(1),
(2), (4) Date: Jan. 26, 2010

(87) PCT Pub. No.: WO2008/043954
PCT Pub. Date: Apr. 17, 2008

(65) Prior Publication Data
US 2010/0137182 A1    Jun. 3, 2010

(30) Foreign Application Priority Data

Oct. 12, 2006   (FR) ...................................... 06 54242

(51) Int. Cl.
*C11D 17/00* (2006.01)
(52) U.S. Cl. ......... 510/201; 510/407; 510/414; 510/505
(58) Field of Classification Search ........................ None
See application file for complete search history.

(56) References Cited

U.S. PATENT DOCUMENTS

| | | | |
|---|---|---|---|
| 3,954,648 A | 5/1976 | Belcak et al. | |
| 5,258,070 A * | 11/1993 | Monteleone et al. | 106/311 |
| 6,096,699 A | 8/2000 | Bergemann et al. | |
| 6,191,087 B1 | 2/2001 | Opre et al. | |
| 6,284,720 B1 | 9/2001 | Opre | |
| 2002/0086808 A1 * | 7/2002 | Nyssen et al. | 510/417 |

* cited by examiner

*Primary Examiner* — Necholus Ogden, Jr.
(74) *Attorney, Agent, or Firm* — Smith, Gambrell & Russell, LLP

(57) ABSTRACT

The present invention relates to compositions which can be used as solvents for the cleaning of paints which are less toxic and less inflammable than white spirit, which is one of the most widely used solvents for the cleaning of paints.
The preferred compositions comprise agriculturally derived materials and are preferably essentially composed of agriculturally derived materials.

4 Claims, No Drawings

COMPOSITIONS THAT CAN ESPECIALLY BE USED AS SOLVENTS FOR CLEANING PAINT WORK

TECHNICAL FIELD

The present invention relates to the field of solvents and more particularly to solvents which can be used for the cleaning of paints.

The term "cleaning of paints" is understood to mean, within the meaning of the present invention, any means for removing a partially dried but not completely aged (case of stripping) paint or varnish which exists, for example, in the form:
- of stains or drops of paint on the floor, on a wall, and the like, generally cleaned with a rag,
- of a deposit of paint or varnish on implements in a container (brushes, rollers, and the like) which it is desired to remove so as to be able to reuse the said implements or container.

PRIOR ART

In the context of the use of solvents for domestic and professional use in the cleaning of paints, the chlorinated solvents and the hydrocarbons (for example, white spirits) conventionally used are increasingly regulated, indeed even banned (for example, trichloroethylene is banned from safe to the general public).

The solvents most widely used for the cleaning of paint are white spirits.

The main constituents of white spirits include:
1—aromatic hydrocarbons corresponding virtually exclusively to benzene hydrocarbons: traces of toluene, xylenes, ethylbenzene (current CMR classification), trimethylbenzenes, methylethylbenzenes, propylbenzenes, and the like, content by weight which can vary from 1 to 20%; toluene carries the following labeling: F R11 Repr. Cat. 3 R63 Xn R48/20–65 Xi R38 R67 R63=possible risk of harm to the unborn child; when white spirit comprises more than 5% by weight of toluene, the R63 mention is obligatory;
2—paraffinic hydrocarbons (normal and iso): from $C_8$ to $C_{12}$ content by weight of between 40 and 60%;
3—cycloparaffinic hydrocarbons: from $C_9$ to $C_{12}$ content by weight generally in the vicinity of 30% but being able to reach 70%.

Conventional commercial white spirit comprises from 17 to 18% of aromatic compounds but its benzene content does not exceed the limit of 0.1% beyond which white spirit would be classified as a CMR (Carcinogenic/Mutagenic/Reprotoxic) substance; conventional white spirit carries the following labeling: Xn (harmful)—N (dangerous for the environment) with the risk phrases: R10 R51/53 R65 R66 R67.

Dearomatized white spirit is also found, which product has the same uses as conventional white spirit but with an aromatics composition which does not exceed 1%, which makes it much less effective; it carries the following labeling:
Xn (harmful)—R10 R65 R66.

The market for paint cleaners includes, in addition to the white spirits described above, other highly dangerous products such as mixtures based on toluene and acetone labeled Xn (harmful) and F (highly inflammable) with the risk phrases R11 R36/37 R48/20 R63 R66.

For the cleaning of paints, use is also made, more in the professional field than by the general public, of products based on heavy naphtha, light naphtha, hydrotreated naphtha and toluene, all these products being, like white spirit, harmful and inflammable.

Aqueous formulations based on surfactants are also found which are not very effective in terms of cleaning, in particular with solvent-based paints.

The thus exists a need to find solvents for the cleaning of paints which make it possible to efficiently remove wet or partially dry paint or varnish in a way analogous to white spirit, in order to meet the needs of users, which are less volatile than white spirit, so as to limit or slow down the evaporation of the solvent in order to prevent the parts to be cleaned from drying excessively rapidly, and also less toxic, both from the viewpoint of the environment and of the personnel who have to handle these solvents.

DESCRIPTION OF THE INVENTION

The present invention relates to novel compositions based on ester(s) of fatty acids and on oxygen-comprising solvent(s).

These solvent compositions make it possible to remove wet or partially dry paint or varnish as effectively as white spirit for the cleaning of paint implements, while being much more friendly to the health of the users and much less ecotoxic than the paint cleaning solvents used hitherto.

In some cases, the compositions according to the invention can result partially or completely from agriculturally derived materials and thus will not comprise any (eco)toxicity labeling, insofar as they are harmless and also noninflammable.

The compositions according to the invention comprise
- from 10 to 90 parts by weight and preferably from 30 to 70 parts by weight of at least one ester, preferably methyl ester, of fatty acids,
- from 10 to 90 parts by weight and preferably from 30 to 70 parts by weight of at least one oxygen-comprising solvent chosen from oxygen-comprising solvents having Hansen solubility parameters (polar components and H bonds) of between 3 and 6 $(cal/cm^3)^{1/2}$.

Mention may be made, among oxygen-comprising solvents, of diacetone alcohol (DAA) of formula $CH_3(C=O)CH_2C(OH)(CH_3)_2$.

It can be obtained by dimerization of acetone in a basic medium. Its physical characteristics are given in Table I. DAA is labeled Xi, irritant with the risk phrase R36.

Mention may also be made of alkyl (methyl, ethyl, propyl, butyl, and the like) lactates or, for example, of some glycol ethers, such as diethylene glycol mono(n-butyl)ether.

The compositions according to the invention exhibit the advantage of being non(eco)toxic and noninflammable and of having a low vapour pressure and thus a slow rate of evaporation and a very faint odour while exhibiting an effectiveness in the cleaning of paint and varnish equivalent to that of white spirit.

Furthermore, the compositions according to the invention exhibit a slightly slower evaporation than white spirit which, in addition to the environmental advantage, prevents damage to implements soiled with paints (brushes with stuck hairs, unusable rollers, and the like) due to excessively rapid drying.

Among the solvent compositions according to the invention, those based on agriculturally derived materials are preferred.

Thus, preferably, the fatty acid ester and the solvent employed in the compositions in accordance with the invention are agriculturally derived materials.

Mention will be made, as example of agriculturally derived materials, of:

fractions formed of methyl esters derived from natural fatty acids, in particular methyl esters derived from fatty acids derived from the castor oil plant, such as, for example, the product sold by the Arkema France under the name Esterol A® (fraction formed of methyl esters of fatty acids which are mainly $C_{18}$ fatty acids and derivatives) which is a light yellow liquid with a faint fatty smell, a flash point of greater than 100° C. (closed cup), a density at 20° C. equal to 890 kg/m³ and a viscosity at 20° C. equal to 7-8 cSt, or methyl esters derived from fatty acids derived from rape, as oxygen-comprising solvent, dimethyl isosorbide (DMI) of formula:

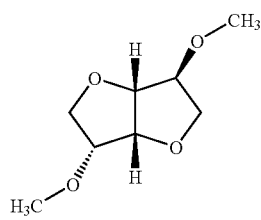

for example obtained from the catalytic dehydration of a sugar (sorbitol), giving isosorbide, followed by a methylation. It is mainly used in the pharmaceutical and cosmetic fields. Its physical characteristics are given in Table I.

The compositions based on methyl esters of fatty acids derived from castor oil and on dimethyl isosorbide are particularly preferred. These two components are not VOCs (volatile organic compounds) according to Directive 1999/13/EC of 11 Mar. 1999, which gives the following definition for VOCs: "Any organic compound, with the exception of methane, having a vapour pressure of equal to or greater than 10 Pa at 20° C. or having a corresponding volatility under particular conditions of use".

Preference is given, in order to approach the viscosity of white spirit, to compositions predominantly based on oxygen-comprising solvent(s) and preferably to those comprising at least 70 parts by weight of DAA and/or DMI and less than 30 parts by weight of fatty acid ester(s).

The viscosity of the compositions according to the invention also depends on the length of the fatty chain of the fatty acid ester or esters; for example, the methyl ester derived from copra (mainly based on $C_{12}$ laurate) has a lower viscosity than that of the $C_{18}$ methyl ester of Esterol A® type. By using an ester with a shorter fatty chain in the composition according to the invention, the viscosity of the final composition is reduced.

The compositions according to the invention can additionally comprise surfactants, preferably nonionic surfactants, and advantageously surfactants based on agriculturally derived materials, for example fatty esters, in particular sucrose fatty esters, with a hydrophilic head based on sugars and a hydrophobic part composed of a fatty chain resulting from plant materials. The compositions according to the invention can additionally comprise compatibilizing agents used as additives for use of the formulations under conditions of very high humidity, such as dimethyl sulphoxide (DMSO) or hexylene glycol.

TABLE I

|  | Diacetone Alcohol | Dimethyl Isosorbide |
|---|---|---|
| Formula | $C_6H_{12}O_2$ | $C_8H_{14}O_4$ |
| State | liquid | liquid |
| Dynamic viscosity (mPa · s) | 3.22 | 6.8 |
| Boiling point | 168° C. | 234° C. |
| Flash point | 58° C. | 120° C. |
| Vapour pressure (Pa) | 130 | <10⁻⁵ |
| Solubility in water | yes | yes |
| Density (g/cm³) | 0.94 | 1.17 |
| Hansen solubility parameters in (cal/cm³)^{1/2} | | |
| $d_D$ (dispersive component) | 7.7 | 8.4 |
| $d_P$ (polar component) | 4.0 | 4.4 |
| $d_H$ (H bonds component) | 5.3 | 4 |

EXEMPLARY EMBODIMENTS OF THE INVENTION

Example 1

The following are mixed at ambient temperature:

30 parts by weight of methyl ester derivatives of $C_{18}$ fatty acids (Esterol A®), 70 parts by weight of diacetone alcohol.

This composition is tested for the removal of paints and varnishes on a large number of substrates. It is found that it has a good ability to clean these substrates, in particular for alkyd paints; furthermore, it has a greater viscosity than that of white spirit.

The composition has a lower rate of evaporation than that of white spirit.

Example 2

The following are mixed at ambient temperature:

30 parts by weight of methyl ester derivatives of $C_{18}$ fatty acids, 70 parts by weight of dimethyl isosorbide.

This composition proves to be even more effective than the composition of Example 1, with the additional advantage of being exclusively based on agriculturally derived materials.

A quantitative applicative test has been developed by the Applicant Company in order to evaluate the effectiveness of the novel formulations.

A thin layer of paint (alkyd paint) or varnish (based on polyurethane resin) is applied using a brush to a piece of pre-weighed tiling. This deposited layer is allowed to dry in the open air for 30 minutes for a paint and 20 minutes for a varnish.

After this drying time, the piece of tiling is immersed in a beaker which contains 20 ml of test composition. After stirring (1000 rev/min) at ambient temperature for 3 minutes, the piece of tiling is removed from the beaker and wiped dry on its unpainted parts.

The piece of tiling is subsequently allowed to dry in the open air and weighed in order to determine the percentage of paint or varnish removed.

The results (evaluation of the percentage of paint or varnish removed) are given in the following Table II.

TABLE II

| Cleaning composition | % of paint removed | % of varnish removed |
|---|---|---|
| Nondearomatized white spirit | 97% | 100% |
| Esterol A ® | 30% | 50% |
| Rapeseed oil methyl ester (RME) | 14% | |
| Esterol A ®/DAA (30/70) | 45% | 61% |
| RME/DAA (50/50) | 40% | |
| Esterol A ®/DMI (30/70) | 74% | 74% |
| Esterol A ®/DMI (50/50) | 69% | 76% |
| Esterol A ®/DMI (70/30) | 72% | 71% |

Although the effectiveness of the compositions according to the invention is poorer, according to this test, than that of nondearomatized white spirit, it should not be lost sight of that the compositions based on Esterol A® exhibit virtually no evaporation (in contrast to white spirit, DAA and DMI); some thereof thus always remains in the form of a thin film on the area of paint to be cleaned, which implies that the true percentages of removal will be greater than those shown in Table II.

The results obtained with rapeseed oil methyl ester are poorer than with Esterol A®, whether pure or as a mixture with DAA.

The rates of evaporation and the viscosities of the various compositions tested are also evaluated.

The measurement of the rate of evaporation is based on the monitoring of the weight of the mixture left in a container over time. The initial rates of evaporation are similar for the compositions based on Esterol A®/DAA or white spirit (of the order of 0.025 g/h). For very long evaporation times, methyl ester (Esterol A® or RME) remains, which makes it possible to prevent the coating implements from being brought to dryness (advantage with respect to white spirit). For the compositions based on agriculturally derived solvents Esterol A®/DMI, in view of the very low vapour pressures, the evaporation becomes extremely slow, which is desired.

The invention claimed is:

1. A cleaning composition comprising
   at least 30 parts by weight of methyl esters, said methyl esters comprise at least one methyl ester of $C_{18}$ fatty acids, and
   30 to 70 parts by weight of a diacetone alcohol oxygen-comprising solvent having Hansen solubility parameters between 3 and 6 $(cal/cm^3)^{1/2}$,
   wherein the cleaning composition is capable of removing paint and varnish.

2. The cleaning composition according to claim 1, comprising at least one fatty acid ester which is a fraction formed of methyl esters derived from natural fatty acids.

3. The cleaning composition according to claim 1, composed essentially of agriculturally derived materials.

4. The cleaning composition according to claim 2, wherein said at least one fatty acid ester is a methyl ester derived from fatty acids derived from the castor oil plant and/or from rape.

* * * * *